(12) United States Patent
Komiyama

(10) Patent No.: US 12,010,230 B2
(45) Date of Patent: Jun. 11, 2024

(54) DEVICE AND METHOD FOR CERTIFYING RELIABILITY OF PUBLIC KEY, AND PROGRAM FOR SAME

(71) Applicant: bitFlyer Blockchain, Inc., Tokyo (JP)

(72) Inventor: Takafumi Komiyama, Minato-ku (JP)

(73) Assignee: BITFLYER BLOCKCHAIN, INC., Tokyo (JP)

( * ) Notice: Subject to any disclaimer, the term of this patent is extended or adjusted under 35 U.S.C. 154(b) by 343 days.

(21) Appl. No.: 17/614,451

(22) PCT Filed: May 29, 2020

(86) PCT No.: PCT/JP2020/021283
§ 371 (c)(1),
(2) Date: Nov. 26, 2021

(87) PCT Pub. No.: WO2020/241817
PCT Pub. Date: Dec. 3, 2020

(65) Prior Publication Data
US 2022/0239481 A1    Jul. 28, 2022

(30) Foreign Application Priority Data
May 29, 2019   (JP) .................................. 2019-100795

(51) Int. Cl.
*H04L 9/30* (2006.01)
*H04L 9/06* (2006.01)

(52) U.S. Cl.
CPC .............. *H04L 9/30* (2013.01); *H04L 9/0643* (2013.01)

(58) Field of Classification Search
CPC ....... H04L 9/30; H04L 9/0643; H04L 9/0869; H04L 9/088; H04L 9/3239; H04L 9/3263; H04L 9/14; H04L 9/3268; H04L 9/3247
See application file for complete search history.

(56) References Cited

U.S. PATENT DOCUMENTS

| | | | |
|---|---|---|---|
| 5,199,070 A  * | 3/1993 | Matsuzaki | ............ H04L 9/3073 380/30 |
| 6,968,060 B1 * | 11/2005 | Pinkas | ...................... H04L 9/30 713/192 |

(Continued)

FOREIGN PATENT DOCUMENTS

| | | |
|---|---|---|
| JP | H 04-191787 | 7/1992 |
| JP | 2005-500740 | 1/2005 |

(Continued)

OTHER PUBLICATIONS

Written Opinion dated Sep. 8, 2020 issued in International Patent Application No. PCT/JP2020/021283.

(Continued)

*Primary Examiner* — Meng Li
(74) *Attorney, Agent, or Firm* — Cozen O'Connor

(57) ABSTRACT

The reliability of a second public key which is part of a second key pair generated in association with a first key pair is certified. A generating apparatus 210 provides certification data to a receiving apparatus 220 (S301). The receiving apparatus 220 transmits a certification request requesting a certification that the second public key PK2 is in a parent-child relationship with the first public key PKI to a certifying apparatus 230 (S302). In this example, the certification request includes the certification data, but if the certification data is provided directly from the generating apparatus 210 to the certifying apparatus 230, the certification request does not need to include the certification data. The certifying apparatus 230 verifies the certification data by calculating a verification formula for the certification data in response to the certification request (S303).

10 Claims, 2 Drawing Sheets

(56) References Cited

U.S. PATENT DOCUMENTS

| | | | |
|---|---|---|---|
| 7,707,420 B1 | 4/2010 | Little | |
| 2009/0106548 A1* | 4/2009 | Arditti | H04L 9/3263 |
| | | | 713/156 |
| 2017/0187537 A1* | 6/2017 | Kim | H04L 9/30 |
| 2018/0144147 A1* | 5/2018 | Nix | H04W 12/35 |
| 2019/0068381 A1* | 2/2019 | Takemori | H04L 9/3268 |
| 2019/0281453 A1* | 9/2019 | Shi | H04L 9/40 |
| 2021/0367779 A1* | 11/2021 | Komiyama | H04L 9/0643 |
| 2022/0239481 A1* | 7/2022 | Komiyama | H04L 9/14 |

FOREIGN PATENT DOCUMENTS

| | | |
|---|---|---|
| JP | 2005-072648 | 3/2005 |
| JP | 2016-025532 | 2/2016 |
| JP | 2016-167230 | 9/2016 |

OTHER PUBLICATIONS

Blaze et al., "Divertible Protocols and Atomic Proxy Cryptography," Lecture Notes in Computer Science, Springer, 1998, vol. 1403, pp. 127-144.

Barenghi et al., "A privacy-preserving encrypted OSN with stateless server interaction: The Snake design", Computers & Security, Elsevier Science Publishers, Amsterdam, NL, vol. 63, Sep. 26, 2016, pp. 67-84.

\* cited by examiner

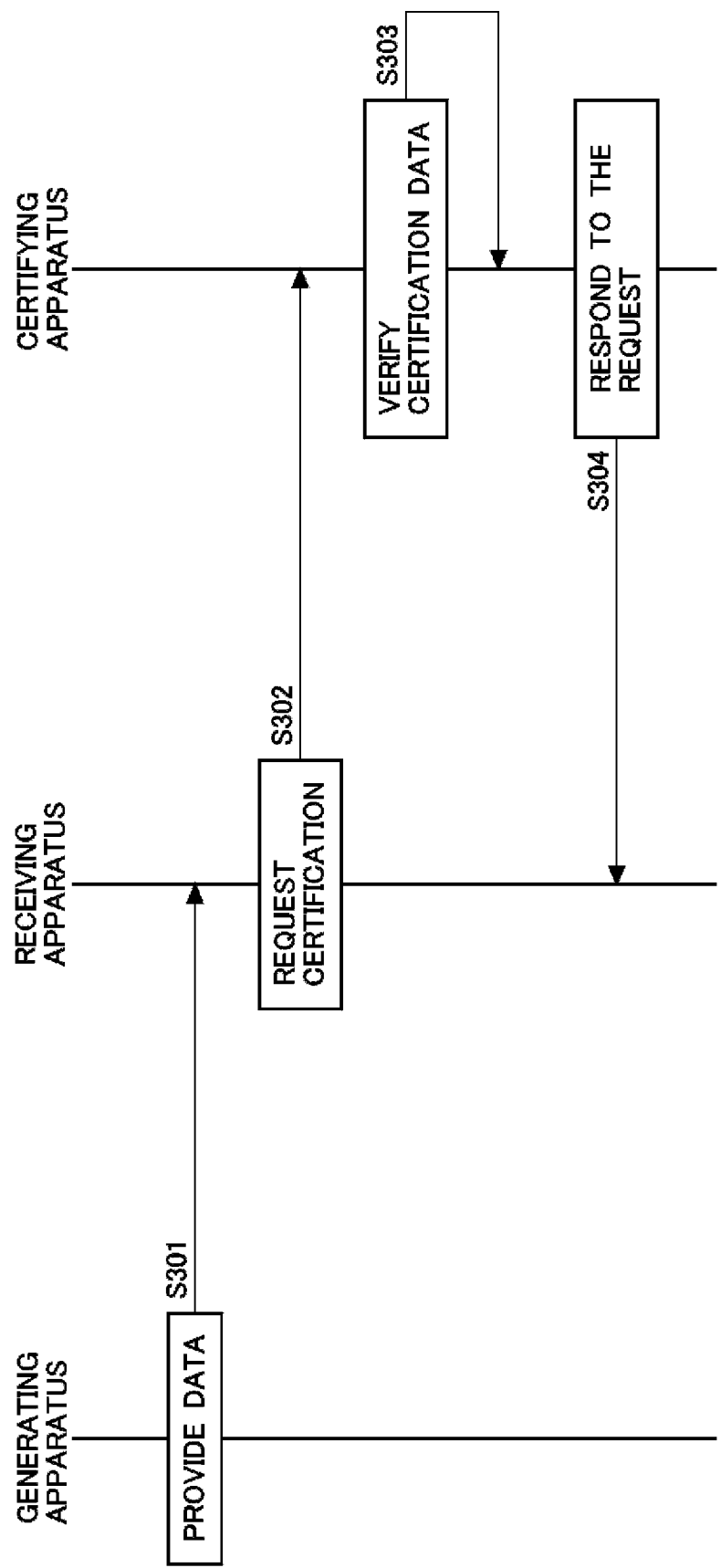

DEVICE AND METHOD FOR CERTIFYING RELIABILITY OF PUBLIC KEY, AND PROGRAM FOR SAME

RELATED APPLICATIONS

This is a U.S. National Phase Application under 35 USC 371 of International Application PCT/JP2020/021283 filed on May 29, 2020.

This application claims the priority of Japanese application no. 2019-100795 filed May 29, 2019, the entire content of both of which are hereby incorporated by reference.

FIELD OF THE INVENTION

One aspect of the present invention relates to an apparatus, method, and program for certifying the reliability a public key.

BACKGROUND OF THE INVENTION

As economic activities on the Internet continue to expand, there is a growing need to reliably identify the actors of such activities.

Digital certificates are often used to guarantee the reliability of data transmitted over the Internet. A digital certificate authenticates the owner of the public key corresponding to the private key used to digitally sign the data being transmitted, and is issued by a reliable certification authority. The recipient of the data confirms the validity of the digital certificate and verifies the digital signature with the public key.

SUMMARY OF INVENTION

In the future, there will be an increase in the number of situations where firm reliability is required for interactions on the Internet, and this will lead to an increase in demand for various forms of digital authentication for different purposes.

However, with the current public key cryptosystem centered on certification authorities, flexibly meeting such demand is not easy.

The first objective of the present invention is to provide an apparatus, method and program for generating a second key pair consisting of a second private key and first public key in association with a first key pair consisting of a reliable first private key and first public key.

A second objective of the present invention is to provide an apparatus, method and program for certifying the reliability of a second public key which is part of a second key pair generated in association with a first key pair.

A third objective of the present invention is to provide an apparatus, method and program for performing or verifying a digital signature using a second key pair generated in association with a first key pair.

To achieve this purpose, the first aspect of the present invention is a method for generating a second key pair consisting of a second private key and a second public key in association with a first key pair consisting of a first private key and a first public key, wherein a first private key and a generator of a cyclic group G are denoted as a and g, and r is a random number or pseudo-random number or a piece of data containing a random number or pseudo-random number, a computer comprising: determining an integer x by a hash function that outputs an integer using a first public key $a \cdot g$ and data r, calculating a second private key ax by multiplying the x to a first private key a (a is an integer) to store the private key ax, and calculating a second public key $ax \cdot g$ based on the first public key a and the x to store the second pubic key $ax \cdot g$.

The second aspect of the present invention is the method of the first aspect, wherein a rank of the cyclic group G is a prime number.

The third aspect of the present invention is the method of the first or the second aspect, wherein the hash function outputs an integer further using a string str, which is data representing an attribute of the second public key $ax \cdot g$.

The fourth aspect of the present invention is the method of the third aspect, wherein the str represents an expiration date of the second public key $ax \cdot g$.

The fifth aspect of the present invention is the method of the first or the second aspect, wherein the data r includes the random number or pseudo-random number, and a string str which is data representing an attribute of the second public key $ax \cdot g$.

The sixth aspect of the present invention is the method of any one of the first to the fifth aspect, further comprising providing the second public key $ax \cdot g$ to a second apparatus other than a first apparatus which generated the second key pair.

The seventh aspect of the present invention is the method of the sixth aspect, wherein the str represents an ID of a recipient of the second public key $ax \cdot g$.

The eighth aspect of the present invention is the method of the sixth aspect, wherein the str represents a relationship of a recipient of the second public key $ax \cdot g$ to an owner of the first public key $ax \cdot g$.

The ninth aspect of the present invention is a program for causing a computer to perform a method of generating a second key pair consisting of a second private key and a second public key in association with a first key pair consisting of a first private key and a first public key, wherein a first private key and a generator of a cyclic group G are denoted as a and g, and r is a random number or pseudo-random number or a piece of data containing a random number or pseudo-random number, the method comprising: determining an integer x by a hash function that outputs an integer using a first public key $a \cdot g$ and data r, calculating a second private key ax by multiplying the x to a first private key a (a is an integer) to store the private key ax, and calculating a second public key $ax \cdot g$ based on the first public key a and the x to store the second pubic key $ax \cdot g$.

The tenth aspect of the present invention is an apparatus for generating a second key pair consisting of a second private key and a second public key in association with a first key pair consisting of a first private key and a first public key, wherein a first private key and a generator of a cyclic group G are denoted as a and g, and r is a random number or pseudo-random number or a piece of data containing a random number or pseudo-random number, configured to: determine an integer x by a hash function that outputs an integer using a first public key $a \cdot g$ and data r, calculate second private key ax by multiplying the x to a first private key a (a is an integer) to store the private key ax, and calculate a second public key $ax \cdot g$ based on the first public key a and the x to store the second pubic key $ax \cdot g$.

The eleventh aspect of the present invention is a method for certifying a reliability of a second public key PK2 which is a part of a second key pair generated in association with a first key pair consisting of a first private key and a first public key PK1, wherein first private key and a generator of a cyclic group G are denoted as a and g, and a first public key PK1 is a·g, a second public key PK2 is ax·g, and r is a random number or pseudo-random number or a piece of data including the random number or pseudo-random number, a computer comprising: receiving a certification request requesting a certification of a reliability of the second public key PK2, wherein the certification request includes certification data, calculating an equation represented by equation (1) in response to the certification request, and transmitting a result of the calculation as a response to the certification request, wherein the calculation comprising: inputting data r included in the certification data into a hash function to output an integer x, and calculating the equation using the integer x.

$$PK2 = xPK1 \tag{1}$$

The twelfth aspect of the present invention is the method of the eleventh aspect, wherein the data r includes the random number or pseudo-random number, and a string str which is data representing an attribute of the second public key ax·g.

The thirteenth aspect of the present invention is the method of the eleventh aspect, wherein the certification data further includes a string str, which is data representing an attribute of the second public key ax·g.

The fourteenth aspect of the present invention is the method of the eleventh aspect, wherein the certification request includes the second public key PK2.

The fifteenth aspect of the present invention is the method of the eleventh aspect, wherein the certification request includes the first public key PK1.

The sixteenth aspect of the present invention a program for causing a computer to perform a method for certifying a reliability of a second public key PK2 which is a part of a second key pair generated in association with a first key pair consisting of a first private key and a first public key PK1, wherein a first private key and a generator of a cyclic group G are denoted as a and g, and a first public key PK1 is a·g, a second public key PK2 is ax·g, and r is a random number or pseudo-random number or a piece of data including the random number or pseudo-random number, the method comprising: receiving a certification request requesting a certification of a reliability of the second public key PK2, wherein the certification request includes certification data, calculating an equation represented by equation (1) in response to the certification request, and transmitting a result of the calculation as a response to the certification request, wherein the calculation comprising: inputting data r included in the certification data into a hash function to output an integer x, and calculating the equation using the integer x.

$$PK2 = xPK1 \tag{1}$$

The seventeenth aspect of the present invention is an apparatus for certifying a reliability of a second public key PK2 which is a part of a second key pair generated in association with a first key pair consisting of a first private key and a first public key PK1, wherein a first private key and a generator of a cyclic group G are denoted as a and g, and a first public key PK1 is a·g, a second public key PK2 is ax·g, and r is a random number or pseudo-random number or a piece of data including the random number or pseudo-random number, configured to: receive a certification request requesting a certification of a reliability of the second public key PK2, wherein the certification request includes certification data, calculate an equation represented by equation (1) in response to the certification request, and transmit a result of the calculation as a response to the certification request, wherein the calculation comprises: inputting data r included in the certification data into a hash function to output an integer x, and calculating the equation using the integer x.

$$PK2 = xPK1 \tag{1}$$

The eighteenth aspect of the present invention is a method for certifying a reliability of a second identifier ID2 generated in association with a first identifier ID1, wherein first integer and a generator of a cyclic group G are denoted as a and g, and the first identifier ID1 is a·g, the second identifier ID2 is ax·g, and r is a random number or pseudo-random number or a piece of data including the random number or pseudo-random number, a computer comprising: receiving a certification request requesting a certification of a reliability of the second identifier ID2, wherein the certification request includes certification data, calculating an equation represented by equation (1) in response to the certification request, and transmitting a result of the calculation as a response to the certification request, wherein the calculation comprising: inputting data r included in the certification data into a hash function to output an integer x, and calculating the equation using the integer x.

$$ID2 = xID1 \tag{1}$$

The nineteenth aspect of the present invention is a program for causing a computer to perform a method for certifying a reliability of a second identifier ID2 generated in association with a first identifier ID1, wherein a first integer and a generator of a cyclic group G are denoted as a and g, and a first identifier ID1 is a·g, a second identifier ID2 is ax·g, and r is a random number or pseudo-random number or a piece of data including the random number or pseudo-random number, the method comprising: receiving a certification request requesting a certification of a reliability of the second identifier ID2, wherein the certification request includes certification data, calculating an equation represented by equation (1) in response to the certification request, and transmitting a result of the calculation as a response to the certification request, wherein the calculation comprising: inputting data r included in the certification data into a hash function to output an integer x, and calculating the equation using the integer x.

$$ID2 = xID1 \tag{1}$$

The twentieth aspect of the present invention is an apparatus for certifying a reliability of a second identifier ID2 generated in association with a first identifier ID1, wherein a first integer and a generator of a cyclic group G are denoted as a and g, and the first identifier ID1 is a·g, the second identifier ID2 is ax·g, and r is a random number or pseudo-random number or a piece of data including the random number or pseudo-random number, configured to: receive a certification request requesting a certification of a reliability of the second identifier ID2, wherein the certification request includes certification data, calculate an equation represented by equation (1) in response to the certification request, and transmit a result of the calculation as a response to the certification request, wherein the calculation comprises: inputting data r included in the certification data into a hash function to output an integer x, and calculating the equation using the integer x.

$$ID2 = xID1 \tag{1}$$

According to an aspect of the present invention, by generating a second key pair in such a way that it can be mathematically proved that a second public key which is a part of the second key pair generated in association with a first key pair is a child key of a first public key which is a part of the first key pair, it is possible to generate the second key pair that can be used for digital sign without the need for a certification authority.

BRIEF DESCRIPTION OF DRAWINGS

FIG. 3 shows an example of the flow of a method for certifying a reliability of a second public key which is a part of a second key pair generated from a first key pair according to the second embodiment of the present invention.

DETAILED DESCRIPTION OF THE DRAWINGS

The following is a detailed description of the embodiments of the present invention with reference to the drawings.

First Embodiment

Figure 1:
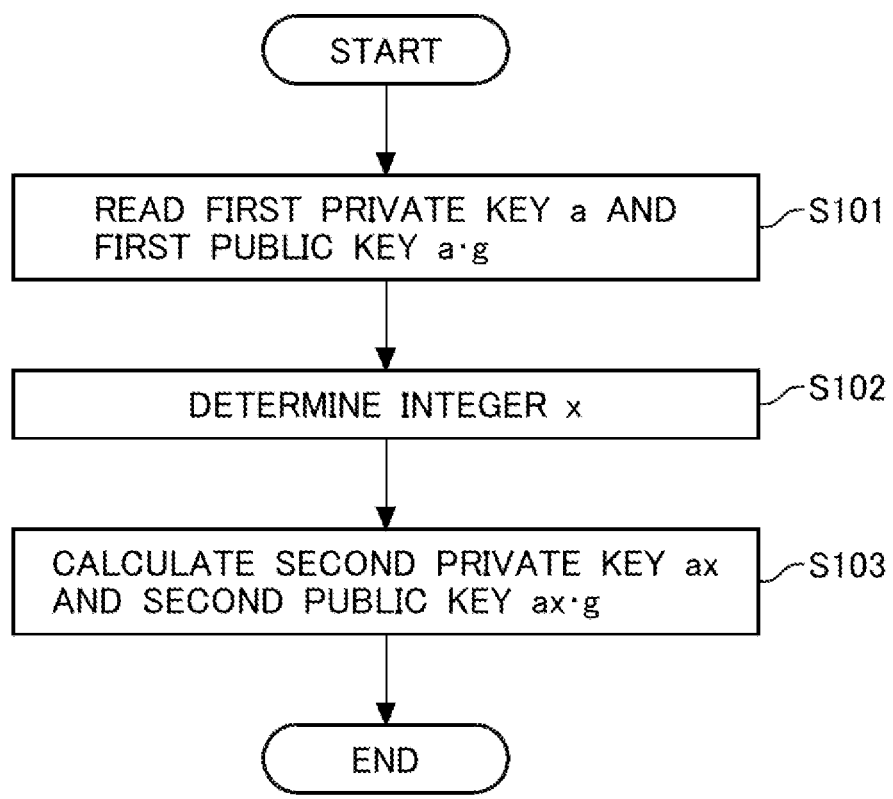
FIG. 1 is a flowchart of a method for generating a second key pair from a first key pair according to the first embodiment of the present invention.

FIG. 1 shows a flowchart of a method for generating a second key pair from a first key pair according to the first embodiment of the present invention. The generation of the key pair can be performed in any apparatus capable of performing the processes described below, and portable devices such as a smart phone, tablet, etc. are the examples. It is not necessarily needed to be connected to a computer network such as the Internet at the time of the generation of the second key pair.

First, a pre-generated first private key a and a first public key a·g are read out as the first key pair (S101). Here, a is an integer. Next, an integer x is determined (S102). Here, the integer x is determined as the value of the hash function h(a·g, str, r) that returns an integer value. The string str represents an attribute of the second public key to be generated, and the number r is a random number or a pseudo-random number. Then, a second private key ax and a second public key ax·g are calculated by multiplying the a as the second key pair and the second key pair is stored (S103).

The string str may be specified by the owner of the first public key a·g when generating the second public key ax·g on the apparatus performing the generation, or it may take a default value. In the storage unit of the apparatus or in a storage medium or a storage apparatus accessible from the apparatus, a program that determines the value of g or its determination procedure, the value of a or its determination procedure, the hash function h, the string str or its determination procedure, the value of the number r or its determination procedure, the determination procedure for the first key pair, and the determination procedure for the second key pair is stored, and the above processes are realized by executing the program. In particular, by executing the program, the above hash function h is read out and the integer x is determined.

The second private key ax and the second public key ax·g are generated in association with the first key pair because they are based on x, which is determined by using the first public key a·g as an argument. The string str may be an arbitrary string. In addition, it is preferable that the string str represents an attribute of the second public key, such as the expiration date of the second key pair, the ID, such as an e-mail address, of the recipient of the second public key, the relationship of the recipient of the second public key to the owner of the first public key, etc. The recipient of the second public key will be discussed later. In the above example of the hash function h, str and r were described as separate arguments, but they can be combined to form a single argument, or the first public key a·g and one or both of the string str and the number r may be combined to form an argument. The hash function h broadly encompasses a hash function that outputs an integer using the first public key a·g, the string str, and the number r.

The string str does not necessarily have to be used, and the hash function h may be viewed more broadly as a hash function that outputs an integer using the first public key a·g and the number r. Here, r can more broadly be data that includes a random number or pseudo-random number, and specifically, it can be a piece of data that includes a string str in addition to a random number or pseudo-random number. As an example, it can be a piece of data formed by combining a random number or pseudo-random number and a string str.

The rank of the generator g is preferably a prime number, and the number of elements of the cyclic group G generated by the generator is preferably equal to or more than about 32 bytes, or 256 bits. Here, the operations in the cyclic group G are described in an additive manner. For example, the operation of repeatedly adding the generator g a times is denoted as a·g, and expressed as "the generator g is multiplied by a." Although multiplication between elements of a set or a subset of integers, such as ax, is also used as a notation in the present Specification, it should be noted that this is different from multiplication in a cyclic additive group. In the present Specification, the cyclic group G is denoted as an additive group, but it should also be noted that it is equivalent to the present invention and belongs to its technical scope even if it is denoted as a cyclic multiplicative group.

The first public key a·g can be assumed to be one whose owner is authenticated by a digital certificate issued by a conventional reliable certification authority in the present embodiment. Alternatively, it can be assumed that the reliability is granted in some way other than authentication by a certification authority. Here, the owner of a public key is a person who has access to the private key corresponding to the public key.

Any cryptographic scheme that is currently known and will become known in the future can be used for a digital signature on arbitrary data m using the first key pair.

Here, the above description assumes that the first private key a and the first public key a·g have been determined and stored in advance, but it is possible to determine the private key a in advance, and calculate the first public key a·g as needed. The first private key a is, in principle, data that will not be externally disclosed, although it may be stored in an external storage medium or storage apparatus for a backup purpose.

One feature of the generation of the second key pair according to the present embodiment is that the second private key ax is the element of a set of integers as in the first private key a, and the second public key ax·g is the element of the cyclic group G generated by the generator g as in the first public key a·g. Because the second key pair is of the same format as the first key pair, it is possible to repeatedly generate child key pairs. For example, the third key pair can be generated from the second key pair, the fourth key pair can be generated from the third key pair, and so on.

It is to be noted that if the term "only" is not written, such as in "based only on x", "in response to x only", or "in case of x only", in the present Specification, it is assumed that additional information may also be taken into account. Also, as an example, it is to be noted that a description "b is performed in case of a" does not necessarily mean "b is always performed in case of a" or "a is performed immediately after a" except where expressly stated.

In addition, as a caveat, even if there are aspects of a method, a program, a terminal, an apparatus, a server or a system (hereinafter referred to as "method, etc.") that perform operations different from those described herein, each aspect of the present invention is intended to perform the same operation as one of the operations described herein, and the existence of an operation different from those described herein does not mean that the method, etc. is outside the scope of each aspect of the invention.

Second Embodiment

Figure 2:
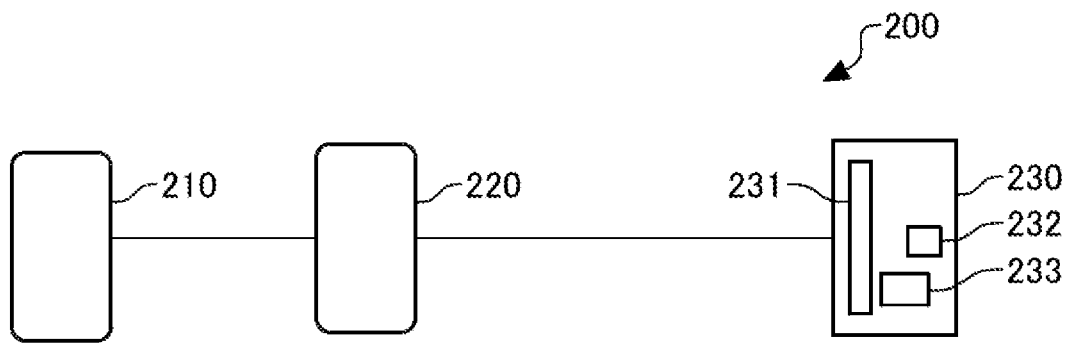
FIG. 2 shows a system for certifying the reliability of a second public key which is a part of a second key pair generated from a first key pair according to the second embodiment of the present invention.

FIG. 2 shows a system for certifying the reliability of a second public key which is a part of a second key pair generated from a first key pair according to the second embodiment of the present invention.

The system 200 comprise a transmitting apparatus 210 that generates a second key pair from the first key pair and transmits a second public key which is a part of the second key pair, a receiving apparatus 220 that receives the second public key, and a certifying apparatus 230 that certifies a reliability of the second public key. The transmitting apparatus 210, the receiving apparatus 220, and the certifying apparatus 230 are capable of communicating with each other via a computer network.

Certifying apparatus 230 is a computer comprising a communication unit 231 such as a communication interface, a processing unit 232 such as a processor, CPU, etc., and a storage unit 2 including a storage apparatus or storage medium, such as a memory, hard disk, etc. and it can realize each process described below by executing a certain program. The certifying apparatus 230 may include one or more apparatuses or servers, and the program may include one or more programs, and the program be recorded in a computer-readable storage medium to form a non-transitory program product. Although not shown in the figure, the transmitting apparatus 210 and the receiving apparatus 220 may have similar hardware configurations.

At the transmitting apparatus 210, the second public key $ax \cdot g$, which is a part of the second key pair generated by the method described in the first embodiment, cannot play a role of identifying its owner unless its reliability can be confirmed at the receiving apparatus 220 that received it. Therefore, in the present embodiment, the receiving apparatus 220 requests the certifying apparatus 230 to certify the reliability of the second public key ax g. Hereinafter, the first public key is also referred to as PK1 and the second public key as PK2.

Specifically, the certifying apparatus 230 may receive a string str and a number r as certification data indirectly via the receiving apparatus 220 or directly from the transmitting apparatus 210. The certifying apparatus 230 uses the first public key PK1, which is somehow known and accessible in the system 200, and calculates the verification formula PK2=xPK1 of certification data. Based on the fact that both sides match, it can be proved that the second public key PK2 was generated by the owner of the first public key PK1.

Here, as explained in the first embodiment as an example, the certifying apparatus 230 can calculate x by $x=h(a \cdot g, str, r)$. In the storage unit 231 of the certifying apparatus 230 or the storage medium or storage device accessible from the certifying apparatus 230, a program that defines the procedure when a certification request is received is stored. In the program, the verification procedure by the above verification formula is particularly defined and the verification by the verification formula is performed by executing the program.

Since the integer x is a value of the hash function h, and it is practically significantly difficult to derive the string str and the number r that gives that value, at the certifying apparatus 230, the provider of the string str and the number r is certified as the person who generated the second public key PK2 based on the fact that both sides of the above verification formula match. For this purpose, the string str is not necessarily needed, and the hash function h can be a function that outputs an integer based on the first public key PK1 and the data r.

The certifying apparatus 230 may be the same as the receiving apparatus 220, and in this case, it can prove the reliability of the second public key PK2 by itself. The certifying apparatus 230 may be the same as the transmitting apparatus 210, in which case the generator of the second public key PK2 proves its reliability by itself. The receiving apparatus 220 may be the same as the transmitting apparatus 210, in which case the owner of the first public key PK1 uses a different second public key PK2 depending on the situation, and certifies the relationship between these keys at the certifying apparatus 230 as necessary.

FIG. 3 shows the flow of the method for certifying the reliability of the second public key in the example where the certifying apparatus receives the certification data from the generating apparatus. In the above description, the term transmitting apparatus is used, but the more generalized term generating apparatus is used in FIG. 3.

The generating apparatus 210 provides the certification data to the receiving apparatus 220 (S301). The method of providing the certification data to the receiving apparatus 220 includes transmission to the receiving apparatus 220 via a computer network, connection of the storage medium storing the certification data to the receiving apparatus 220, input of the certification data displayed on the display screen of the generating apparatus 210 to the receiving apparatus 220, reading by the image sensor of the receiving apparatus 220 of the certification data or corresponding data displayed on the display screen of the generating apparatus 210, etc. Various aspects similarly exist for providing the first public key PK1 and second public key PK2 to the receiving apparatus 220 or other apparatus from the generating apparatus 210.

The receiving apparatus 220 that has received the certification data transmits a certification request, which requests the certification that the second public key PK2 was generated by the owner of the first public key PK1, in other words, the certification that the second public key PK2 has a parent-child relationship with the first public key PK1, to the certifying apparatus 230 (S302).

The certification request includes the certification data in this example, but in examples where the certification data is provided directly from the generating apparatus 210 to the certifying apparatus 230, it need not be included. As mentioned above, in the case where the generating apparatus 210 also serves as the certifying apparatus 230, "provision" includes provision to itself. Also, in the case where the receiving apparatus 220 is the same as the generating apparatus 210, "provision" includes provision to itself. In addition, a "certification request" includes a request to itself when the generating apparatus 210 or the receiving apparatus 220 also serves as the certifying apparatus 230.

The certification request can also include the second public key PK2, which is the child key in the parent-child relationship to be certified, and the first public key PK1, which is the parent key in the parent-child relationship, can also be included. At least one of the parent key and the child key can be provided directly or indirectly from the generating apparatus 210 to the certification apparatus 230 and stored in the certifying apparatus 230 in advance, thereby eliminating the need for explicit specification in the certification request.

The certifying apparatus 230 verifies the certification data by calculating the verification formula for the certification data in response to the certification request (S303).

Then, the certifying apparatus 230 transmits the verification result or calculation result as a response to the certification request from the receiving apparatus 220 (S304). In the case where the receiving apparatus 220 also serves as the certifying apparatus 230, the receiving apparatus 220 stores the verification results in its own storage apparatus or storage medium. Such a process may be included in the concept of "transmission" to itself. The results to be transmitted include whether the two sides of the verification equation matched, whether the verification was successful and the like.

In the above explanation, each of the first public key PK1 and second public key PK2 has been positioned as a "public key," but they can also be positioned as "identifiers" of actors that conduct some activities on the Internet. Specifically, the spirit of the present invention can be understood as an apparatus, method, and program for evaluating a reliability of a second identifier ID2 generated based on or in association with the first identifier ID1.

Third Embodiment

The transmitting apparatus 210 can pass the receiving apparatus 220 the second private key ax in addition to the second public key ax·g. There are various possible aspects of providing the second private key ax as with the other data. In this case, the receiving apparatus 220 can perform a digital signature on data m using the second key pair. If it has received the certification data from the transmitting apparatus 210, it can pass the certification data to the receiver of the digital signature along with the data m and the signature s. The recipient can show that the digital signature is by a second key pair generated by the owner of the first public key a·g. In the case where the generating apparatus 210 also serves as the receiving apparatus 220, that is, the owner of the first public key a·g uses the second key pair by himself, the owner is the signer.

The receiving apparatus 220 functions here as a signing apparatus, and transmits certification data, as a part of signed data formed by adding a signature s to the data m or as separate data from the signed data, and at least one of the first public key a·g and the second public key ax g as necessary to other apparatus.

If the receiving apparatus 220 has been provided with the second private key ax, a third key pair including a third private key axy and a third public key axy·g can be generated as a further child key pair of the second key pair. Here, the integer y can be determined as the value of the hash function h(ax·g, str, r).

In the above description, it is added that the various variants described in each embodiment can be applied to other embodiments as well.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

REFERENCE SIGNS LIST 200 system
210 transmitting apparatus
220 receiving apparatus
230 certifying apparatus
231 communication unit
232 processing unit
233 storage unit

The invention claimed is:

1. A method for certifying a reliability of a second public key PK2 which is a part of a second key pair generated in association with a first key pair consisting of a first private key and a first public key PK1, wherein the first private key and a generator of a cyclic group "G" are denoted as "a" and "g", and the first public key PK1 is "a·g" and a second public key PK2 is "ax·g", where "x" is an integer, and "r" is a random number or a pseudo-random number or a piece of data including the random number or the pseudo-random number, the method comprising:
 receiving a certification request requesting a certification of the reliability of the second public key PK2, the certification request including certification data,
 calculating an equation PK2=xPK1 in response to the certification request, and
 transmitting a result of the calculation as a response to the certification request, wherein the r is included in the certification data, and
 wherein the calculation comprises:
  inputting the r into a hash function to output the integer x, and
  calculating the equation using the integer x.

2. The method according to claim 1, wherein the r includes the random number or pseudo-random number, and a string "str" which is data representing an attribute of the second public key ax·g.

3. The method according to claim 1, wherein the certification data further includes a string, "str" which is data representing an attribute of the second public key ax·g.

4. The method according to claim 1, wherein the certification request includes the second public key PK2.

5. The method according to claim 1, wherein the certification request includes the first public key PK1.

6. A non-transitory computer readable medium encoded with a computer program which, when executed by a computer, causes certification of a reliability of a second public key PK2 which is a part of a second key pair generated in association with a first key pair consisting of a first private key and a first public key PK1, wherein the first private key and a generator of a cyclic group "G" are denoted as "a" and "g", and a first public key PK1 is "a·g" and a second public key PK2 is "ax·g", where "x" is an integer and "r" is a random number or pseudo-random number or a piece of data including the random number or pseudo-random number, the computer program comprising:

program code for receiving a certification request requesting the certification of the reliability of the second public key PK2, the certification request including certification data, program code for calculating an equation PK2=xPK1 in response to the certification request, and program code for transmitting a result of the calculation as a response to the certification request, wherein the calculation comprises:
inputting the r included in the certification data into a hash function to output the integer x, and
calculating the equation using the integer x.

7. An apparatus for certifying a reliability of a second public key PK2 which is a part of a second key pair generated in association with a first key pair consisting of a first private key and a first public key PK1, the apparatus comprising:

a processor, and
memory,
wherein the first private key and a generator of a cyclic group "G" are denoted as "a" and "g", and a first public key PK1 is "a·g" and a second public key PK2 is "ax·g", where "x" is an integer and "r" is a random number or pseudo-random number or a piece of data including the random number or pseudo-random number, wherein the apparatus is configured to:
receive a certification request requesting the certification of the reliability of the second public key PK2, the certification request including certification data,
calculate an equation PK2=xPK1 in response to the certification request, and
transmit a result of the calculation as a response to the certification request, wherein the r is included in the certification data, and
wherein the calculation comprises:
inputting the r into a hash function to output the integer x, and
calculating the equation using the integer x.

8. A method for certifying a reliability of a second identifier ID2 generated in association with a first identifier ID1, wherein a first integer and a generator of a cyclic group "G" are denoted as "a" and "g", and the first identifier ID1 is "a·g" and the second identifier ID2 is "ax·g", where "x" is an integer and "r" is a random number or pseudo-random number or a piece of data including the random number or pseudo-random number, the method comprising:

receiving a certification request requesting a certification of the reliability of the second identifier ID2, the certification request including certification data,
calculating an equation ID2=xID1 in response to the certification request, and
transmitting a result of the calculation as a response to the certification request, wherein the calculation comprises:
inputting the r included in the certification data into a hash function to output the integer x, and
calculating the equation ID2 using the integer x.

9. A non-transitory computer readable medium encoded with a computer program which, when executed by a computer, causes certification of a reliability of a second identifier ID2 generated in association with a first identifier ID1, wherein a first integer and a generator of a cyclic group "G" are denoted as "a" and "g", and the first identifier ID1 is "a·g" and the second identifier ID2 is "ax·g", and where "x" is an integer and "r" is a random number or pseudo-random number or a piece of data including the random number or pseudo-random number, the method computer program comprising:

program code for receiving a certification request requesting a certification of the reliability of the second identifier ID2, the certification request including certification data,
program code for calculating an equation represented by an equation ID2=xID1 in response to the certification request, and
program code for transmitting a result of the calculation as a response to the certification request, wherein the calculation comprises:
inputting the r included in the certification data into a hash function to output the integer x, and
calculating the equation using the integer x.

10. An apparatus for certifying a reliability of a second identifier ID2 generated in association with a first identifier ID1, the apparatus comprising:

a processor, and
memory,
wherein a first integer and a generator of a cyclic group "G" are denoted as "a" and "g", and the first identifier ID1 is "a·g" and the second identifier ID2 is "ax·g",
wherein "x" is in integer and "r" is a random number or pseudo-random number or a piece of data including the random number or pseudo-random number, wherein the apparatus is configured to:
receive a certification request requesting a certification of the reliability of the second identifier ID2, the certification request including certification data,
calculate an equation ID2=xID1 in response to the certification request, and
transmit a result of the calculation as a response to the certification request, and
wherein the calculation comprises:
inputting the r included in the certification data into a hash function to output the integer x, and
calculating the equation using the integer x.

* * * * *